United States Patent [19]

St. Onge

[11] 4,245,970
[45] Jan. 20, 1981

[54] APPARATUS HAVING A TUBULAR INFLATABLE BLADDER AND A GROUT DISPENSING NOZZLE FOR CONNECTING LATERAL BRANCHES TO A RELINED MAIN

[76] Inventor: Henri S. St. Onge, Unit 2, 1600 Brimley Rd., Scarborough, Ontario, Canada

[21] Appl. No.: 948,383

[22] Filed: Oct. 4, 1978

Related U.S. Application Data

[62] Division of Ser. No. 575,624, May 8, 1975, abandoned.

[51] Int. Cl.³ .................. B29D 27/04; B32B 5/20; F16L 55/12
[52] U.S. Cl. .................................. 425/13; 138/93; 138/97; 264/36; 264/45.2; 264/46.9; 264/155; 408/127; 425/289; 425/470
[58] Field of Search .................. 425/470, 471, 11, 13, 425/14, 27, 289; 264/45.2, 46.9, 36, 154, 155; 138/97, 93; 408/127

[56] References Cited

U.S. PATENT DOCUMENTS

| 3,593,749 | 7/1971 | Reardon | 138/93 |
| 3,602,263 | 8/1971 | Bremner | 138/97 |
| 3,618,639 | 11/1971 | Daley et al. | 138/97 |
| 3,762,446 | 10/1973 | Tungseth et al. | 138/97 |
| 3,834,421 | 9/1974 | Daley | 138/97 |
| 3,834,422 | 9/1974 | Larson | 138/97 |
| 3,870,085 | 3/1975 | Schneider | 138/93 |
| 3,894,131 | 7/1975 | Speech | 264/45.2 |
| 3,950,461 | 4/1976 | Levens | 264/46.9 X |
| 4,083,384 | 4/1978 | Horne et al. | 138/93 |

*Primary Examiner*—Philip Anderson

[57] ABSTRACT

A method for connecting a lateral sewer line to a main sewer line which is relined with a plastic pipe liner, comprises plugging a lateral sewer line upstream of the main sewer line to seal off the lateral sewer line, spraying a grout material downstream of the location of the plug until the space between the main sewer line and the plastic pipe liner is filled, allowing the group material to set, removing the plug from the lateral sewer line and providing an opening through the grout material and the plastic pipe liner so that the lateral sewer line is connected to and in communication with the plastic pipe liner. An apparatus which is used to plug the lateral sewer line and dispense the grout material comprises a spray gun positioned within a tubular inflatable bladder where the nozzle for the spray gun is in front of the bladder. The apparatus also includes means for conveying compressed air to and for conveying compressed air from the inflatable bladder. The inflatable bladder expands within a lateral sewer line which is connected to the main sewer line when compressed air is conveyed to the inflatable bladder and means for conveying grout material under pressure to the spray gun is provided to dispense the grout material in the space between the main sewer line and the plastic pipe liner.

3 Claims, 3 Drawing Figures

APPARATUS HAVING A TUBULAR INFLATABLE BLADDER AND A GROUT DISPENSING NOZZLE FOR CONNECTING LATERAL BRANCHES TO A RELINED MAIN

This is a division of application Ser. No. 575,624 filed May 8, 1975 and now abandoned.

FIELD OF INVENTION

This invention relates to a method and apparatus for connecting a lateral sewer line from a remote location to a plastic pipe liner which is located in an existing main sewer line.

BACKGROUND OF THE INVENTION

In the older parts of a city, the main sewer lines are usually in bad repair and require relining. The existing main sewer line may be relined with a plastic pipe liner which is inserted within the existing sewer line. In order to permit insertion of the plastic pipe liner the outside diameter of the liner is less than the inside diameter of the main sewer so that a space is formed between the plastic pipe liner and the main sewer line. In connecting a lateral sewer line to a plastic pipe liner, it is necessary to fill this space at least around the lateral sewer line where it meets the main sewer line with a grout material. Methods which contemplate the connection of a lateral sewer line to a plastic pipe liner usually entail prolonged periods of service shutdown and therefore an inconvenience to the home owner. Such methods are usually very costly and become prohibitive when several laterals are encountered in relining a main sewer line.

SUMMARY OF THE INVENTION

It is therefore an object of the invention to provide apparatus for connecting a lateral sewer line to a plastic pipe liner of a relined main sewer line with substantial reduction of installation cost and time spent in connecting the lateral sewer lines.

It is another object of the invention to provide apparatus for connecting a lateral sewer line to a plastic pipe liner which can be carried out from a remote location, for example from the cleanout opening of a lateral line found inside a building being serviced or from a shallow pit dug in front of the building at the entry of the lateral sewer line into the building.

It is another object of the invention to provide apparatus for connecting a lateral sewer line to a plastic pipe liner in a main sewer line which requires substantially reduced service time so that each lateral sewer line is out of service for a very short period.

It is a further object of the invention to provide an apparatus which may be used to plug a lateral sewer line which is to be connected to a plastic liner and spray a grout material into the space between the plastic pipe liner and the main sewer line.

It is another object of the invention to provide a hole cutting device for forming an opening in the grout material and the plastic pipe liner to connect the lateral sewer line to the plastic pipe liner.

It is another object of the invention to provide an apparatus for spraying an expandable polymeric foam type chemical grout to fill the space between the plastic pipe liner and the main sewer line in connecting the lateral sewer line to the plastic pipe liner.

The method according to this invention for connecting a lateral sewer line to a main sewer line which is relined with a plastic pipe liner entails the steps of providing a plug in a lateral sewer line which is located immediately upstream of a main sewer line to temporarily seal off the lateral sewer line, spraying a grout material downsteam of the location of the plug seal at least until the space defined between the main sewer line and the plastic pipe liner is filled adjacent the lateral sewer line, allowing the grout material to set, removing the plug seal from the lateral sewer line, and providing an opening extending through the set grout material and the plastic pipe liner whereby the lateral sewer line is connected to and in communication with the plastic pipe liner.

An apparatus which may be used for dispensing the grout material between a main sewer line and a plastic pipe liner positioned within the main sewer line, comprises means for dispensing the grout material under pressure, an inflatable bladder positioned rearwardly of a dispensing outlet of the means for dispensing the grout material, means for conveying compressed air to and for conveying compressed air from the inflatable bladder where the inflatable bladder expands within a lateral sewer line which is connected to a main sewer line when compressed air is conveyed to the inflatable bladder and means for conveying grout material under pressure to the means for dispensing the grout material. This apparatus may therefore be used to plug the lateral sewer line being serviced and also dispense the grout material which is forced under pressure between the main sewer line and the plastic pipe liner adjacent the lateral sewer line.

A hole cutting device according to the invention which may be used in providing the opening in the plastic pipe liner comprises a hollow cylindrical body portion with carbide tipped cutting edges at one end thereof. A pilot drill extends centrally outwardly from the cutting edges of the hole cutting device. The hole cutting device is connected to a flexible rotary driven shaft. The shaft has a flexible portion at least adjacent the device and located proximate the flexible portion is means for centrally locating the hole saw in a lateral sewer line which contacts the inside surface of the lateral sewer line to guide the hole saw to ensure that an opening is formed in the plastic pipe liner which is in line with the opening of the lateral sewer line.

BRIEF DESCRIPTION OF THE DRAWINGS

These and other objects, advantages and features of the invention will become apparent in the following detailed description of the preferred embodiments of the invention as shown in the drawings wherein.

DETAILED DESCRIPTION OF THE PREFERRED EMBODIMENTS

Figure 1:
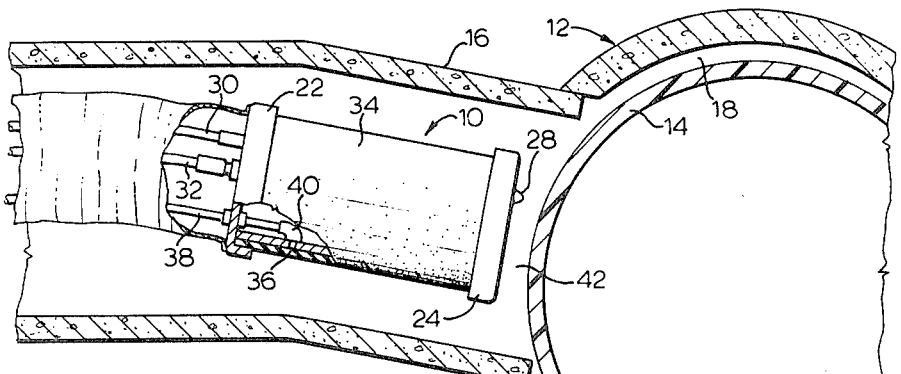
FIG. 1 is a sectioned view of a main sewer line having a plastic pipe liner disposed therein with a lateral sewer line connected to the main sewer line, an apparatus according to the invention being positioned in the lateral sewer line.

Referring to FIG. 1 of the drawings, an apparatus 10 according to the invention for dispensing a grout material under pressure between a main sewer line 12 and a plastic pipe liner 14 is positioned in a lateral sewer line 16. The plastic pipe liner 14 has a smaller outside diameter than the inside diameter of the main sewer line 12 to facilitate insertion of the plastic pipe liner within the main sewer line. As shown, the plastic pipe liner rests on the bottom of the main sewer line 12 so that a part annular space 18 is defined between the main sewer line 12 and the outside surface of the plastic pipe liner 14. The apparatus 10 is inserted in the lateral sewer line 16 from a remote location, for example, it may be inserted through the cleanout opening in the sewer line which is located within the building being serviced. Another manner of entry into the lateral is by an excavation made next to the building where the lateral sewer line is close to the ground surface, an opening being formed in the lateral sewer line to permit insertion of the apparatus 10. The apparatus 10 is fed into the lateral sewer line until it contacts the plastic pipe liner 14.

Figure 2:
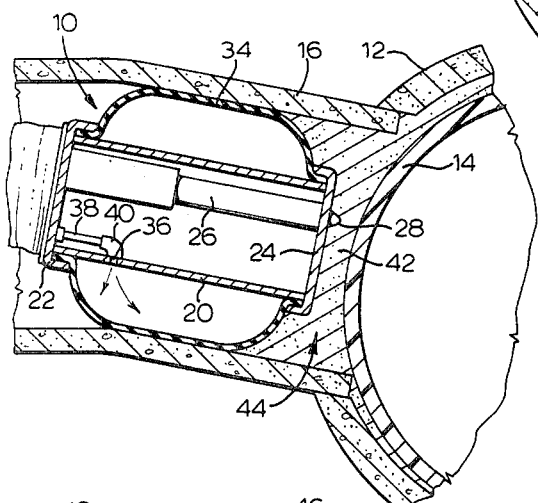
FIG. 2 of the drawings shows an apparatus according to the invention dispensing grout material between a main sewer line and a plastic pipe liner.

Referring to FIG. 2, the apparatus 10 comprises a hollow cylindrical body portion 20 which has at each end thereof, end caps 22 and 24. A spray device 26 is used to dispense the grout material. The spray device is mounted in end caps 22 and 24 where the nozzle 28 of the spray device is mounted in end cap 24. Conduits 30 and 32 convey grout material under pressure to the spray device 26.

A bladder having an expandable tubular body portion 34 is sealably connected at each end of the cylindrical body portion 20 of the apparatus 10 by means of end caps 22 and 24. An opening 36 is provided in the cylindrical body portion and a conduit 38 is mounted in end cap 22 and connected by end cap 40 to opening 36. Compressed air is conveyed to the inflatable bladder by conduit 38 where the compressed air is forced through the opening 36 between the expandable tubular body portion 34 of the bladder and the outside surface of the cylindrical body portion 20 to inflate the bladder so that the exterior surface of the tubular body portion 34 contacts the inside surface of the lateral sewer line 16 in the manner shown in FIG. 2.

The inflatable bladder seals the lateral sewer line 16 when inflated. A grout material is dispensed through nozzle 28 of spray device 26 to fill the annular space 18 between the main sewer line 12 and the plastic pipe liner 14 and also space 42 which is between the plastic pipe liner and the seal formed by the inflatable bladder. The spraying of the grout material is continued until spaces 18 and 42 are filled. It is understood however, that the shape of the apparatus 10 may be modified so that the forward face thereof seats up against the outside surface of the plastic pipe liner 14 and the grout material is dispensed from nozzles mounted in forward peripheral portion of the apparatus to fill space 18 and whatever space is left between the seal in the lateral sewer line 16 and the surface of the plastic pipe liner 14, thereby reducing the amount of grout material used. The grout material indicated by arrow 44 is allowed to set and then the inflatable bladder is deflated by permitting the compressed air in the inflatable bladder to be conveyed therefrom through conduit 38. The end cap 24 and the outside surface of inflatable bladder 34 may be coated with a non-sticking finish to prevent the grout material adhering to the apparatus and thereby facilitate removal of the apparatus 10 from the lateral 16.

Various grout materials may be used in the apparatus, for example, cement grouts and expandable polymeric foam type chemical grouts. As shown in FIGS. 1 and 2, there are two conduits 30 and 32 which lead to the spray device 26. These conduits deliver chemical grout ingredients to the spray device under pressure where the chemicals delivered in conduits 30 and 32 are mixed in the spray device prior to their dispensing through nozzle 28. Several types of chemical grouts may be used. For example, polyurethane foam grouts are particularly useful. A polymeric foam grout sold by Madison Chemical Industries under the trade mark "AS-10" may be used. This type of chemical grout cures at temperatures from minus 30° F. to 130° F., even in the presence of water. The cure rate of this polymeric foam can be regulated from a few minutes to several hours depending upon the ratio of amounts of chemicals fed through conduits 30 and 32. After spraying, the expansion factor of this type of chemical grout is very appreciable so that all cracks, voids and the like in the main and lateral sewer lines are filled as the grout expands during its setting.

The conduits 30, 32 and 38 are sufficiently flexible to permit insertion of the apparatus 10 into the lateral sewer line 16 but at the same time, provide sufficient rigidity to permit feeding of the apparatus 10 along the lateral sewer line 16 to the plastic pipe liner 14. Control valves (not shown) may be located remotely from the apparatus 10 to control the supply of grout material to the spray device 26 and the supply of compressed air to the inflatable bladder.

Figure 3:
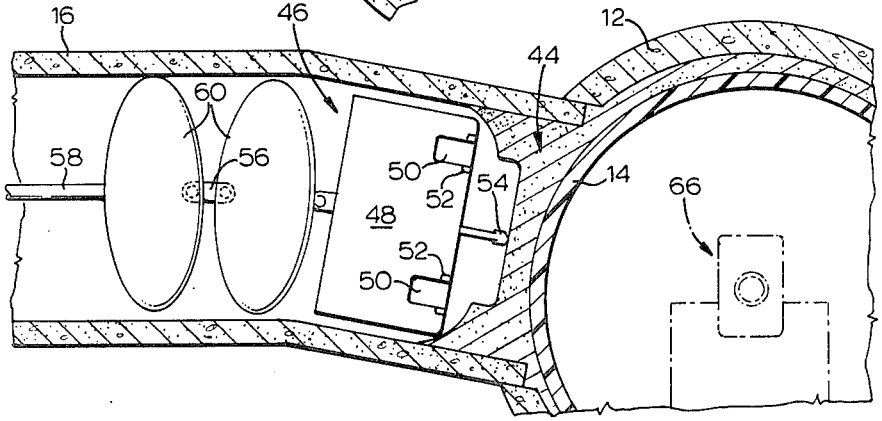
FIG. 3 of the drawings shows a hole cutting device according to the invention for forming a hole in the set grout material and the plastic pipe liner, the operation being observed by video camera.

After the expanded chemical grout material 44 has set, the apparatus is deflated and removed. A hole cutting device which is shown in FIG. 3 may be fed into lateral sewer line 16 until it contacts the set grout material 44. The hole cutting device 46 has a hollow cylindrical body portion 48 and cutting slots 50 with carbide tips 52. A centrally located pilot drill 54 is provided in front of the carbide cutting edges 52. Universal joints 56 are provided on a flexible shaft 58 to permit insertion in laterals which have bends at connection to the main of 45° or more. Adjacent the universal joints 56, ball-shaped guides 60 are positioned. The flexible shaft 58 may be rotatively driven by a remote motor. The ball-shaped guides 60 centre the hole cutting device 46 in the lateral 16 so that an opening is cut through the set grout material 44 and the plastic pipe liner 14 which is aligned with the opening of the lateral sewer line 16. If a cement grout is used, the hole cutting device would be provided with diamond tip cutting edges and the shaft 58 would be adapted to transmit sufficient force to the cutting device in order to penetrate the cement material.

The operation of cutting the hole in the set grout material 44 and the plastic pipe liner 14 may be observed from within the plastic pipe liner by a video camera 66 which transmits a signal to a remotely-located television. Such a television may be positioned beside the person operating the hole cutting device 46 so that the operator may observe the cutting of the hole to ensure that the hole is properly formed in the plastic pipe liner 14 to provide unobstructed communication between the lateral sewer line 16 and the inside of the plastic pipe liner 14. As soon as the operation of the hole cutting device 46 observes by way of the remotely located television camera at his side that the opening in the plastic pipe liner 14 has been completed, the hole cutting device 46 is removed from the lateral sewer line 16 to complete the connection of the lateral sewer line 16 to the plastic pipe liner 14. The set grout material which fills space 18 seals the plastic pipe liner 14 relative to the lateral 16 to ensure a direct flow from the lateral 16 to the inside of the plastic pipe liner 14.

Although various preferred embodiments of the invention are shown in the drawings and are discussed herein in detail, it should be understood by those skilled in the art that variations may be made thereto without departing from the spirit of the invention or the scope of the appended claims.

The embodiments of the invention in which an exclusive property or privilege is claimed are defined as follows:

1. An apparatus for dispensing a grout material under pressure between a main sewer line and a plastic pipe liner positioned within a main sewer line comprising a spray device having a nozzle for dispensing the grout material under pressure; a hollow cylindrical body portion having first and second end caps at the ends of the cylindrical body portion for housing said spray device; said spray device nozzle mounted in said first end cap to dispense the grout material outwardly and immediately forward of said first end cap; a bladder having an expandable tubular body portion and being mounted in surrounding relationship on said cylindrical body portion, each end of the tubular body portion being sealably connected to the respective end of the cylindrical body portion; means for conveying compressed air to and for conveying compressed air from said inflatable bladder, said inflatable bladder being adapted to expand within a lateral sewer line which is connected to a main sewer line when compressed air is introduced into said inflatable bladder; and means for conveying grout material under pressure to said spray device for dispensing grout from said nozzle.

2. An apparatus of claim 1 wherein said spray device is adapted to dispense an expandable chemical grout and wherein said apparatus has means for mixing said expandable chemical grout prior to spraying of said grout between the main sewer line and the plastic pipe liner.

3. An apparatus of claim 2 wherein said expandable chemical grout consists of at least two components; said means for conveying said grout material comprises at least two conduits which are connected to said spray device for conveying said at least two omponents.

* * * * *